United States Patent
Scoggin, Jr. et al.

[15] 3,654,754
[45] Apr. 11, 1972

[54] RAKE HEAD

[72] Inventors: Baxter I. Scoggin, Jr., Kansas City; Woodrow E. Vaughan; Gerald D. Reed, both of Independence, all of Mo.

[73] Assignee: Modern Plastic Sales, Independence, Mo.

[22] Filed: Dec. 21, 1970

[21] Appl. No.: 100,199

[52] U.S. Cl. ..........................................56/400.17, 15/160
[51] Int. Cl. ..........................................A01d 7/00
[58] Field of Search...............15/21, 40, 106, 107, 110, 142, 15/143 R, 143 A, 145, 159 R, 159 A, 160, 186, 187, 188, 236; 56/400.17, 400.18, 400.21, 400.11, 400.12; 172/378, 379, 380

[56] References Cited

UNITED STATES PATENTS

| | | | |
|---|---|---|---|
| 1,179,008 | 4/1916 | Tto | 56/400.17 |
| 1,956,263 | 4/1934 | Anderson | 56/400.17 |
| 2,456,876 | 12/1948 | Keller et al. | 56/400.17 |
| 2,935,754 | 5/1960 | Abdo et al. | 15/110 X |
| 3,164,945 | 1/1965 | Spencer | 56/400.12 |
| 3,332,223 | 7/1967 | Polisso | 56/400.17 |

FOREIGN PATENTS OR APPLICATIONS

| | | | |
|---|---|---|---|
| 454,899 | 3/1949 | Canada | 56/400.17 |

*Primary Examiner*—Russell R. Kinsey
*Attorney*—Schmidt, Johnson, Hovey & Williams

[57] ABSTRACT

A multipurpose hand rake designed for rug and carpet rejuvenation, as well as lawn and garden use, has a virtually indestructible head molded from a thermoplastic resin and including a plurality of equally spaced, flexible teeth or tines extending in fan-shaped relation from a convex edge of a base plate to which a handle is removably attached. The teeth are provided with elongated, entirely unconfined shanks that are highly vibratory in all directions and include angularly offset, pulsating fingers having flat, terminal ends which provide a trip-hammer action for beating into matted floor coverings to loosen dirt and raise the nap, all without snagging and without damage, such as pulling out bonded tufts. The fingers also penetrate deeply into heavy turf and thick, dense mats to loosen and easily remove leaves, grass cuttings, thatch and other debris without damage to live, decorative growth.

12 Claims, 10 Drawing Figures

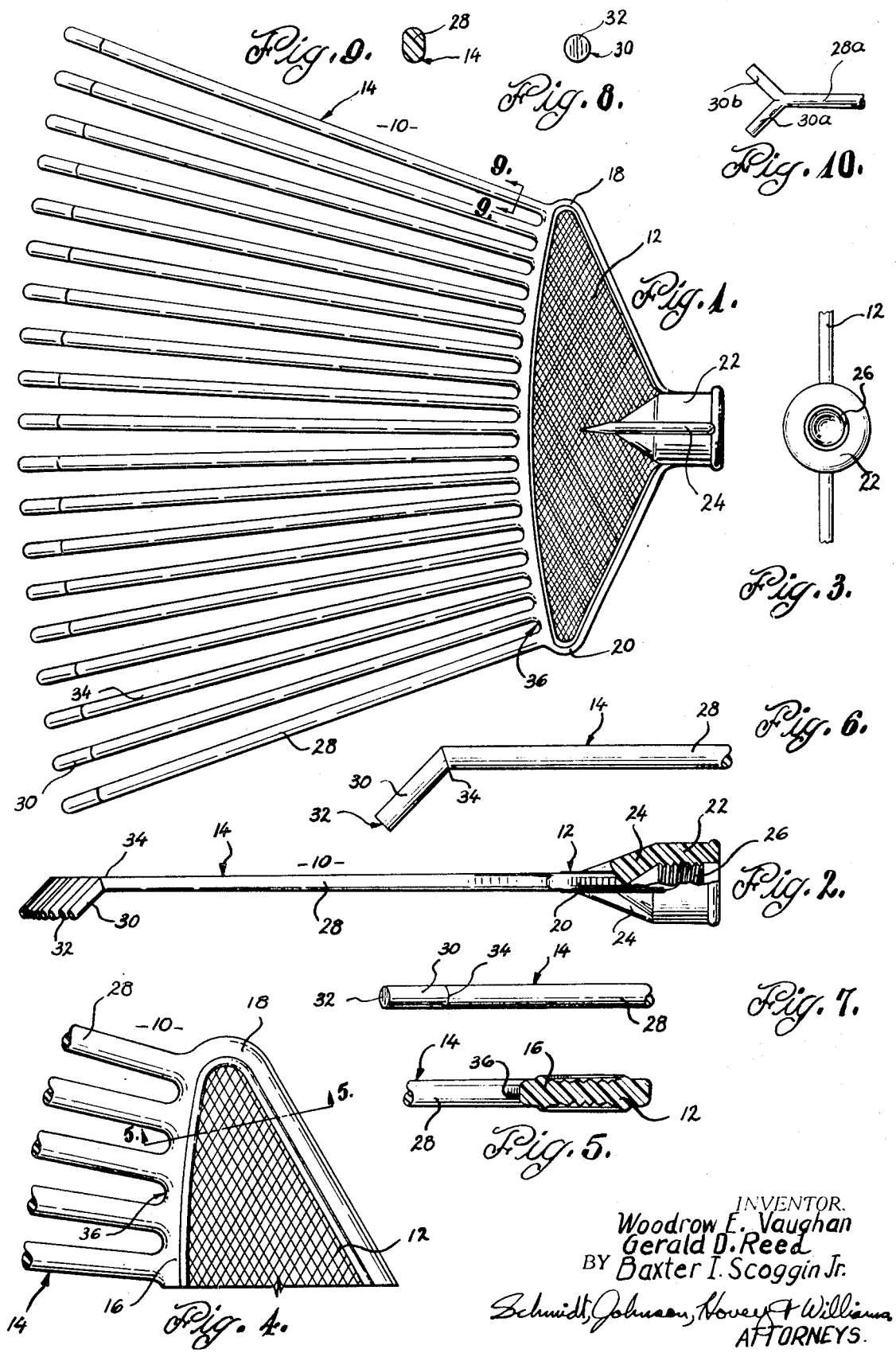

RAKE HEAD

The relatively recent rise in the popularity of shag rugs has created problems of care not easily met with conventional vacuum cleaners and other appliances. The soft, fluffy and airy appearance and feel which floor coverings of such nature impart are soon lost, particularly in heavily traveled areas, and dirt collections in the matted zones are difficult to remove. No satisfactory rug conditioner for home use has heretofore been developed.

Hand rakes, as such, have been made from many types of material such as metal, bamboo, wood and wire. And multitudes of sizes, shapes and styles have been suggested. But none is satisfactory for inside use because they fail to perform all needed functions, both in short, dense fibers and in long, coarse tangled masses, of raising the nap, loosening of dirt, and prevention of damage to the rug or carpet. Moreover, conventional rakes for outdoor use all have one or more disadvantages, most notable of which is lack of long-lasting characteristics. Efforts to provide adequate strength have resulted in undue weight, excessive expense or aggravating clogging. Attempts to provide increased vibratory action have resulted in high breakage, bending and other malfunctions and ineffective operation.

It is an important object of our present invention, therefore, to provide a hand rake that is especially useful in solving the problem of rug rejuvenation, not only in raising matted nap or carpet "trails" but in loosening dirt before vacuuming.

Another important object of the instant invention is the provision of a rug or carpet conditioning tool that is sufficiently light in weight and adequately automatic in its rug beating function, as well as in its nap-raising task, as to be easily and quickly used by the housewife as often as is needed, eliminating the tendency for delay because of desire to defer a disagreeable housecleaning drudgery.

Still another important object of the present invention is to provide a rug conditioner which may also be used as a garden tool in preference to all other types of rakes because of its ease of use, improved results, long lasting characteristics and many other attributes, as will hereinafter appear.

In the drawing:

FIG. 1 is a plan view of a rake head made pursuant to our present invention;

FIG. 2 is a side elevational view, parts being broken away for clearness;

FIG. 3 is a fragmentary end elevational view;

FIG. 4 is a fragmentary plan view similar to FIG. 1 but on an enlarged scale;

FIG. 5 is a fragmentary detailed cross-sectional view taken on line 5—5 of FIG. 4;

FIG. 6 is an enlarged fragmentary side elevational view of one of the teeth;

FIG. 7 is an enlarged fragmentary bottom view of one of the teeth;

FIG. 8 is an end elevational view of one of the fingers of the teeth;

FIG. 9 is a cross-sectional view taken on line 9—9 of FIG. 1; and

FIG. 10 is a fragmentary side elevational view of a modified form of tooth.

Rake head 10 is preferably molded in one piece from a suitable thermoplastic resin such as a polycarbonate that is highly shock resistant, weatherproof and not easily damaged by heat or fire. Other comparable products having moldability properties include polyethylene, polypropylene, polyphenol oxide and nylon.

Head 10 includes a generally triangular base plate 12 supporting a plurality of identical, equally spaced rake teeth 14 integral with the plate 12 and extending forwardly in fan-shaped relation from an elongated longitudinally convex edge 16 of plate 12 which spans the distance between arcuate corners 18 and 20 of plate 12. The third rearmost corner of the plate 12 is provided with an integral boss or socket member 22 having upper and lower reinforcing gussets 24 and internal threads 26 for removably receiving a handle (not shown).

Each tooth 14 has a normally straight, elongated, flexible shank 28 and an elongated, straight, relatively short finger 30 integral with that end thereof opposite to the plate 12. The fingers 30 extend outwardly and downwardly from their shanks 28 at an angle of less than 90° (preferably at about 45°) and terminate in flat, outwardly and downwardly facing tip ends 32.

The spacing between the teeth or tines 14 progressively increases from the plate 12 to the tips 32, and particularly notable is the fact that the teeth 14 are entirely unconfined throughout the lengths of their shanks 28 and their fingers 30 for free flexing and vibratory action in all directions. That is to say, cross bracing between the shanks 28, as is contemplated by many types of conventional rakes, is herein neither needed nor desired.

While the tips 32 are preferably circular as shown in FIG. 8, and although such configuration is continued with uniform diameter throughout the lengths of the fingers 30, the cross-sectional configuration of the fingers 30 may be varied. Ends 32 should, however, be flat, as aforementioned, and perpendicular to the longitudinal axes of the fingers 30.

The shanks 28, on the other hand, have cross-sectional areas that progressively increase as the edge 16 of plate 12 is approached with the cross-sectional configuration of each shank 28 being circular and of substantially the same diameter as the fingers 30 at the angular juncture 34 between the shanks 28 and their fingers 30.

At their base ends adjacent edge 16 the shanks 28 have an oval configuration as shown in FIG. 9, such cross-sectional shape thereof progressively changing to circular as the junctures 34 are approached. The width of shanks 28 (across their minor axes at edge 16) is approximately the same throughout the lengths of the shanks. But the distance across the normally upright major axes of shanks 28 at edge 16 is somewhat greater to provide increased bend-back strength without sacrificing vibratory action in any direction.

Virtually the only action during normal use which might tend to cause breakage would be the result of slamming the head against sidewalks or other hard surfaces at the corners 18 and 20. For this reason these corners are extended outwardly beyond the proximal tines 14 to withstand blows of that nature and thereby prevent tine break off.

Moreover, for added strength, the edge 16 is transversely convex as best seen in FIG. 5 and there are provided arcuate bights 36 between the shanks 28 at edge 16, eliminating sharp corners, joints and other lines of weakness.

Head 10 is, therefore, designed to be used with tip ends 32 horizontal and the fingers 30 vertical so that shanks 28 are inclined to about a 45° angle, permitting the operator to stand erect. With the rake so properly held in that position, a sweeping action in one direction pulls the fingers across the rug nap with little physical effort on the part of the user. This immediately loosens the shaggy, tangled mass of pile and as the sweeping action is continued, the matted down condition of the rug or carpet is restored to its proper soft, shaggy and airy appearance, all without damage to the nap or tufts.

The action is the result of various advantageous features of the head 10 itself. The fingers 30 penetrate deeply into the nap and slide smoothly therethrough so that they slip easily therefrom at the end of each stroke, raising and disentangling the same without snagging. At the same time, because of the highly flexible nature of the unbraced or unconfined tines 14, they yield individually to the slightest resistance, thereby obviating any tendency by the fingers 30 to pull the tufts loose from their anchorings in the base of the floor covering. Moreover, during each flexure of each tine 14 and release thereof a vibratory action is established that is transmitted to all remaining tines 14. This highly vibratory nature of the tines 14 creates a nap raising and fluffing action which cannot be duplicated in any other type of rake or rug rejuvenator.

Still further, as the tines 14 repeatedly rebound as the result of the vibration, a pounding or beating action is set up in each of the ends or tips 32 of the fingers 30 in trip hammer pulsating fashion such as to loosen dirt that has accumulated on the nap and deeply within the rug. The conditioning action may then be followed by the usual vacuuming procedures to remove all of the dirt thus loosened. The flatness and angularity of the tip ends 32 are therefore particularly advantageous from the standpoint of the hammering effect just described and also from the standpoint of protection against snagging or other damage which might otherwise occur if the ends 32 were pointed or not perpendicular to the sides of the fingers 30 as shown in the drawing. To this end, therefore, all of the cantilever teeth 14 should be smooth and uninterrupted throughout their lengths in total absence of sharp projections and jagged edges which would tend to snag and hang up in the pile or damage valuable furniture.

While the head 10 is particularly useful in connection with the raising and fluffing of both long and short, as well as dense and coarse nap of shag rugs without streaking, it may also be used to advantage in the beautification and treatment of floor coverings other than shag, especially from the standpoint of loosening of dirt preparatory to vacuuming, as above explained. Its use is not limited to the housewife. Tightly rolled rugs may be beautified for display at the retail store and by workmen after the rug is laid in the home to raise the nap which becomes matted under pressure during storage and shipment.

The action is much the same when the head is used for lawn and garden purposes. Here again, a vibratory action takes place such as to render the teeth 14 self cleaning and to loosen material to be removed from lawns, in and around shrubbery and elsewhere. It is not necessary that the head 10 be large and heavy as is often believed advantageous by rake manufacturers. The head 10 weighs but 17 ounces, measures only about 8 inches between the corners 18 and 20 and little more than 14 inches between the two outermost fingers 30 when not expanded. Shanks 28 are about 8 ½ inches long and the fingers measure three-fourths inch in length.

While we do not wish to be limited by dimensions, the measurements above set forth show that as much work can be done in the same length of time with a small light weight rake head, if properly designed, than with most large, heavy and cumber-some rake heads of conventional nature. It should be recognized that when pressure is applied to the tips 32 against such surfaces as floor coverings and lawns, the tines 14 spread apart or expand to provide added coverage. There is presented, therefore, a flexible broom-like rake providing a whip action during use much like a flexible fishing rod.

The vibratory action also renders the rake self cleaning. Leaves and grass cannot wedge between the teeth 14 and substantial bending can take place without danger of breaking. In this connection, the increased dimensions of shanks 28 at their major axes help protect them against bend-back breakage while retaining the advantage of high flexibility laterally to set up the vibrations needed for the good results above explained.

Head 10 is non-corrosive, being unaffected by normal extremes of heat or colt, sunlight or rain, and can be kept clean by mere soap and water washing. The handle will not twist in the hands of the user, causing blisters, and the fingers 30 can be easily projected into confined locations for loosening and removal of leaves and other debris.

In FIG. 10 of the drawing there is illustrated a modification in which each shank 28a is provided with a pair of fingers 30a and 30b extending angularly in opposite directions to permit a sweeping action in both directions if one should so desire.

The importance of the unrestricted lateral movement of the teeth 14, a feature not found in the prior art, cannot be overemphasized. This results not only because the design makes it possible to omit cross bracing or other interconnection between the teeth outwardly from the edge 16, but because of the convex nature of edge 16 and the cross-sectional configuration shown in FIG. 9, the latter of which, of itself, permits a very large amount of sidewise movement of the teeth 14, as well as substantial bend-back movement of the teeth 14 without danger of breakage. These factors increase the tendency of the teeth 14 to flare or fan out during use, increase the tendency of the teeth 14 to vibrate, and therefore fluff the carpet, and eliminate tracking or rutting of the rug, all of which attributes are lacking in rakes heretofore suggested. It is but necessary to hold the fingers 30 against the rug with only a slight pressure as they are swept across the rug. Head 10 still pulls easily because the spreading and vibrating actions of the teeth 14 cause the fingers 30 to easily penetrate the rug such that the entire rug conditioning task can be completed with little effort in but a fraction of the time required by other devices used for such purpose.

Having thus described the invention, what is claimed as new and desired to be secured by Letters Patent is:

1. In a hand rake,
    a supporting plate of thermoplastic resin having an elongated, longitudinally convex edge; and
    a plurality of identical, equally spaced rake teeth extending outwardly in fan-shaped relation from said edge,
    each tooth having a normally straight, elongated, flexible shank integral at one end thereof with said edge, and an elongated, straight, relatively short finger integral with the opposite end of the shank,
    said fingers extending outwardly and downwardly from their shanks at an angle of less than 90 degrees and terminating in flat, outwardly and downwardly facing tips,
    the spacing between the teeth progressively increasing from said plate to said tips,
    said teeth being entirely unconfined throughout the lengths of their shanks and their fingers from said plate to said tips for free flexing and vibrating action in all directions.

2. In a hand rake as claimed in claim 1, said fingers having circular cross-sectional configurations of substantially uniform diameters throughout the lengths thereof.

3. In a hand rake as claimed in claim 1, the cross-sectional area of each shank progressively increasing as said edges are approached.

4. In a hand rake as claimed in claim 1, each shank having an oval cross-sectional configuration at said edge.

5. In a hand rake as claimed in claim 4, the minor transverse axes of said shanks at said edge extending laterally thereof.

6. In a hand rake as claimed in claim 5, the lengths of the major axes of said shanks progressively increasing as said edge is approached.

7. In a hand rake as claimed in claim 5, said shanks having circular cross-sectional configurations at said fingers, the lengths of said minor axes being substantially the same as the diameters of the shanks at said fingers.

8. In a hand rake as claimed in claim 7, said fingers being provided with circular cross-sectional configurations having diameters substantially equal to said diameters of the shanks at the fingers.

9. In a hand rake as claimed in claim 1, said edge being transversely convex, the bights between the shanks at said edge being concave.

10. In a hand rake as claimed in claim 1, said plate being substantially triangular and provided with a pair of opposed, arcuate corners at said edge projecting outwardly beyond the proximal shanks.

11. In a hand rake as claimed in claim 10; and an internally threaded, rearwardly opening, handle-receiving socket integral with the plate at the third corner of the latter.

12. In a hand rake as claimed in claim 1, each shank having a second, elongated, straight, relatively short finger integral with said opposite end thereof, extending outwardly and upwardly and terminating in a flat, outwardly and upwardly facing tip.

* * * * *